United States Patent [19]

Fenton

[11] Patent Number: 4,756,736
[45] Date of Patent: Jul. 12, 1988

[54] APPARATUS FOR DISTRIBUTING GOBS IN A GLASSWARE MANUFACTURING MACHINE

[75] Inventor: Frank A. Fenton, Doncaster, England

[73] Assignee: Emhart Industries, Inc., Farmington, Conn.

[21] Appl. No.: 902,036

[22] Filed: Aug. 25, 1986

Related U.S. Application Data

[63] Continuation of Ser. No. 637,095, Aug. 2, 1984, abandoned.

[30] Foreign Application Priority Data

Aug. 13, 1983 [GB] United Kingdom ............... 8321860

[51] Int. Cl.⁴ .......................... C03B 7/00; C03B 7/14
[52] U.S. Cl. ..................................... 65/225; 65/304
[58] Field of Search ............... 65/126, 127, 212, 225, 65/304, 328; 425/257, 585

[56] References Cited

U.S. PATENT DOCUMENTS

| | | | |
|---|---|---|---|
| 2,637,429 | 5/1953 | Pond | 65/304 |
| 3,142,553 | 7/1964 | Cook | 65/304 |
| 3,147,102 | 9/1964 | Trudeau | 65/304 |
| 3,333,938 | 8/1967 | Zappia | 65/304 |
| 3,721,544 | 3/1973 | Bystriany et al. | 65/304 |
| 3,775,083 | 11/1973 | Nebelung et al. | 65/304 |
| 4,379,715 | 4/1983 | Garza | 65/304 |
| 4,505,731 | 3/1985 | Morris et al. | 65/304 |
| 4,531,961 | 7/1985 | Hileman et al. | 65/304 |

FOREIGN PATENT DOCUMENTS 1266975 3/1972 United Kingdom ............... 65/304

Primary Examiner—Kenneth M. Schor
Assistant Examiner—Michael K. Boyer
Attorney, Agent, or Firm—Spencer T. Smith

[57] ABSTRACT

A gob distributor has two scoops, one arranged to be aligned with some sections of the machine to deliver gobs thereto and the other arranged to be so aligned with other sections of the machine. Turning means is operable to turn the scoops to bring them to desired orientations for alignment with their respective sections and moving means is operable to move the distributor to bring either of the scoops below a feeder orifice from which gobs are supplied. In this way, the scoops share the distribution function. If more than one gob is to be supplied simultaneously, further pairs of scoops can be used.

4 Claims, 2 Drawing Sheets

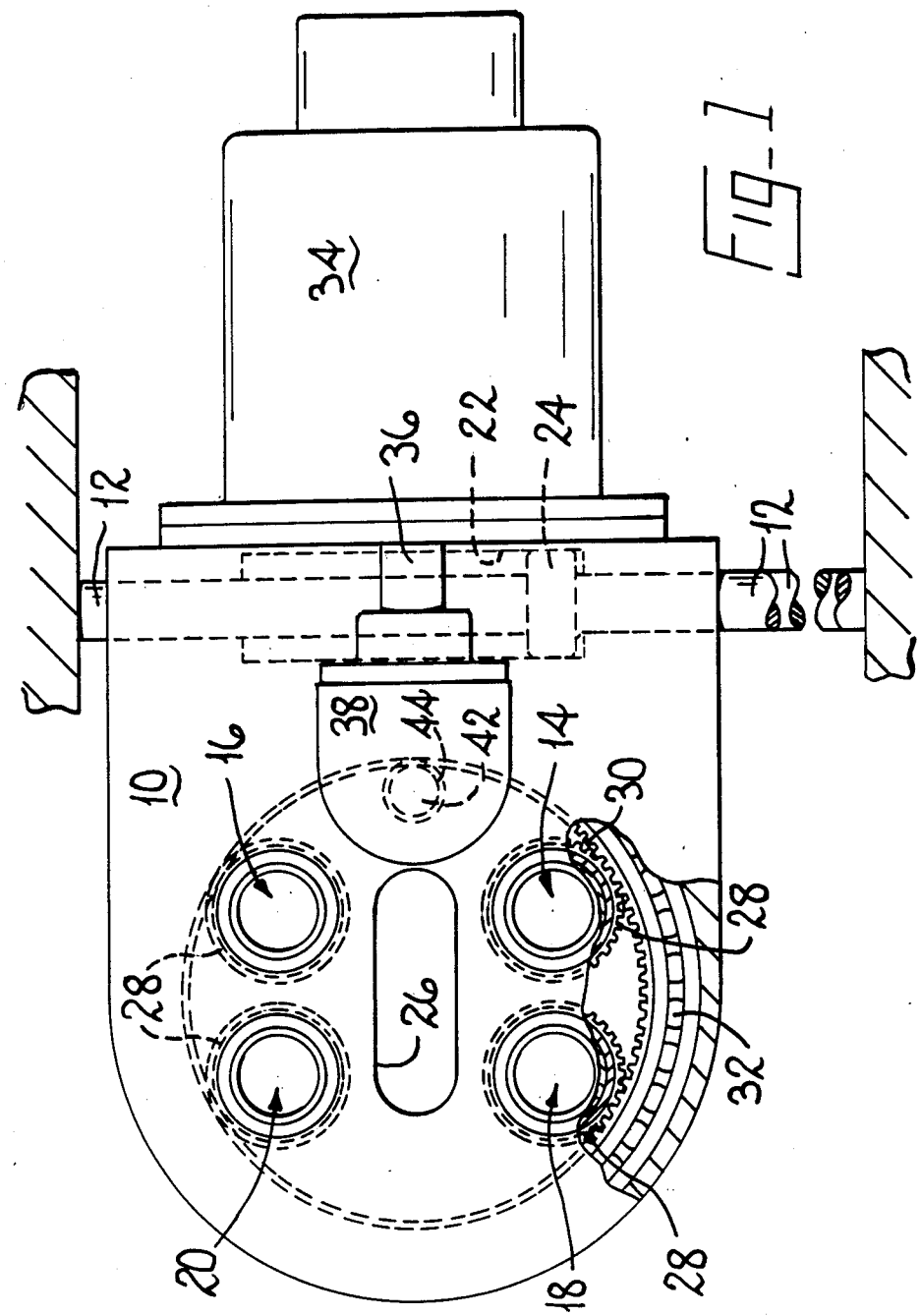
Fig_1

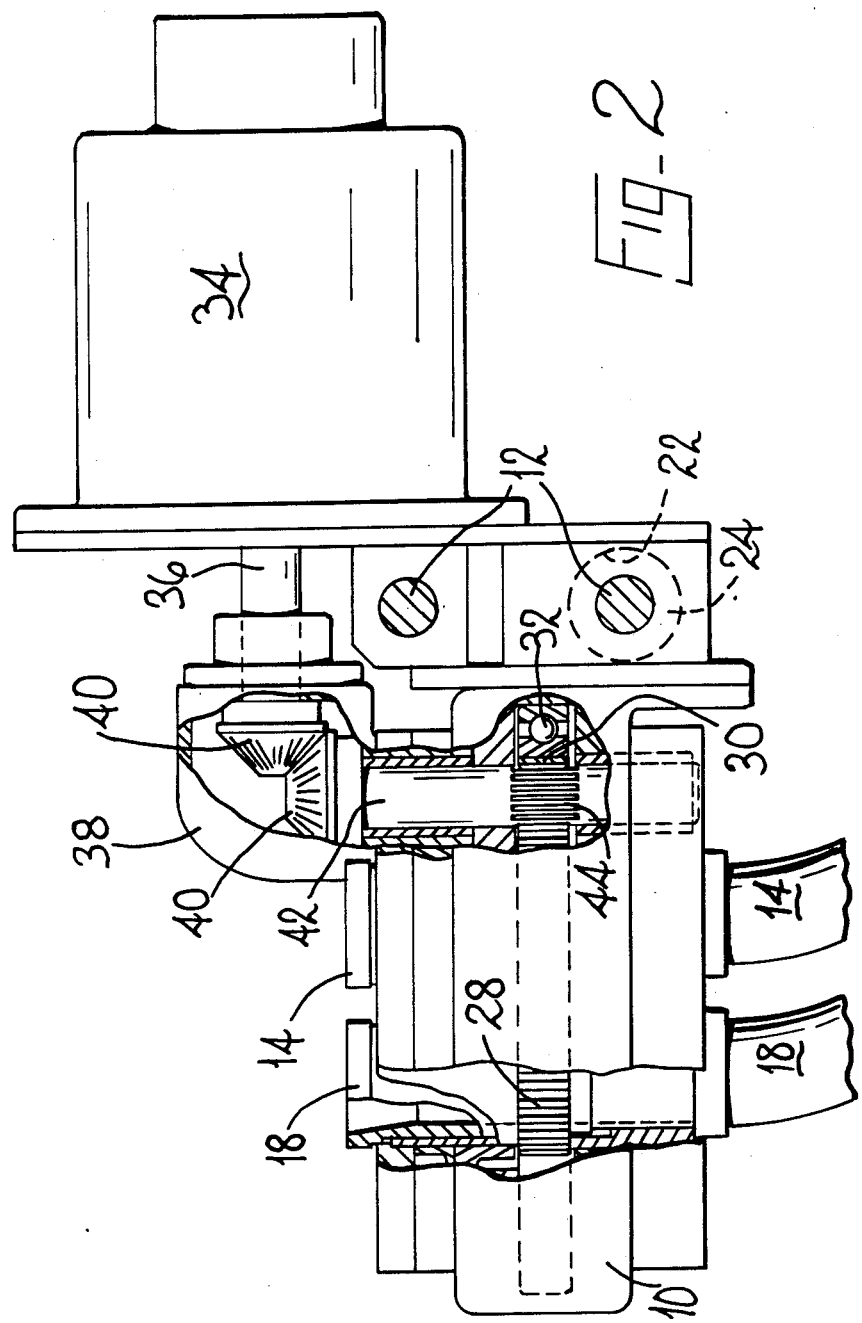

ical section type and with a
method of distributing gobs in such a machine.

APPARATUS FOR DISTRIBUTING GOBS IN A GLASSWARE MANUFACTURING MACHINE

This is a continuation of co-pending application Ser. No. 637,095 filed on Aug. 2, 1984, now abandoned.

BACKGROUND OF THE INVENTION

This invention is concerned with distributing gobs in a glassware manufacturing machine and in particular with a gob distributor for a glassware manufacturing machine of the individual section type and with a method of distributing gobs in such a machine.

A glassware manufacturing machine of the individual section type comprises a plurality of individual glass moulding units called "sections". Each section can be arranged to operate in either a single gob mode, or in double, triple or, even, quadruple mode in which one, two, three or, even, four articles are moulded simultaneously. Each section has a parison mould for each article to be moulded simultaneously, the parison mould being used to mould a gob of molten glass into a parison which is then transferred to a blow mould of the section in which the parison is blown into a completed article. The sections of the machine, there are commonly 6, 8 or 10, are all mounted on a common frame and gobs of molten glass are delivered to the sections in turn by a common gob distributor which delivers the required number of gobs to the section simultaneously. The sections work in timed relationship to one another starting in the order in which they receive gobs from the distributor.

A conventional gob distributor comprises one or more gob-directing scoops depending on which mode the sections are operating. Each scoop is in the form of a trough which is curved in a vertical plane and has an upper end vertically beneath an orifice of a feeder from which gobs of molten glass are released to fall into the scoop. The scoop has a lower end arranged to be aligned with any of a number of gob guides, one for each section, which lead to the sections so that the scoop delivers the gob to the guide. The lower end of the scoop is aligned with guides of different sections, so that successive gobs are delivered to different sections, by turning the scoop about a vertical axis passing through its upper end by means of turning means of the distributor. The turning means comprises an externally-toothed ring-shaped gear on which the scoop is mounted with the scoop passing through the gear, the gear being arranged to turn about the aforementioned vertical axis. The turning means also comprises a rack having teeth which mesh with teeth of gears of each scoop. The rack is spring-urged against a constantly-rotating cam which moves the rack back and forth to turn the gears and therefore the scoops in a selected manner. Thus, if there are six sections, the rack brings each scoop to rest in six orientations which correspond to delivering gobs to the six sections in timed relationship with the fall of gobs from the orifice.

In the conventional gob distributor described above, a single scoop must swing through large arcs between the arrival of successive gobs, e.g. in a six section machine the scoop will have to swing through the width of 3 sections at times as can be seen from a conventional "firing order" which is 1, 4, 3, 6, 5, 2 where the sections are numbered from one end of the machine. This requires that the distributor is bulky having long scoops and a long rack. Because of this bulk, the distributor is expensive and is difficult to move both to align it with the feeder orifice or to remove it from such alignment in the event of an emergency stop situation. This disadvantage becomes more acute if the number of sections is increased.

It is an object of the present invention to provide a gob distributor which is less bulky than the conventional distributor described above.

BRIEF SUMMARY OF THE INVENTION

The invention provides a gob distributor for a glassware manufacturing machine of the individual section type operable to distribute gobs of molten glass to individual sections of the machine in a selected sequence, the individual sections being arranged side by side and each having a gob guide arranged to guide gobs delivered thereto to a mould of the section, the distributor comprising a first gob-directing scoop arranged to deliver a gob to any of the gob guides of a first group of the sections and a second gob-directing scoop arranged to deliver a gob to any of the gob guides of a second group of the sections, the first and the second gob-directing scoops each having an upper end arranged to receive a gob falling from a feeder orifice and a lower end arranged to be aligned with gob guides of any of the first or the second group of sections respectively so that the scoop delivers the gob to the guide, and positioning means operable to position a selected one of the scoops so that its upper end is vertically below the feeder orifice and its lower end is aligned with the gob guide of a selected one of the sections of the group of sections associated with the scoop, the positioning means comprising moving means operable to move the gob distributor selectively to a first position thereof in which the upper end of the first scoop is vertically below the feeder orifice or to a second position thereof in which the upper end of the second scoop is vertically below the feeder orifice, and turning means operable to turn each of the scoops about a respective vertical axis to bring the lower end thereof to an orientation such that, when the upper end of the scoop is vertically below the feeder orifice, the lower end thereof is in alignment with the gob guide of a selected one of the sections.

In a gob distributor according to the last preceding paragraph, each scoop only delivers gobs to a group of the sections, e.g. 3 out of 6, so that the number of turning movements can be reduced and the maximum swing of the scoop can also be reduced to the width of 2 sections and the bulk of the distributor can be reduced accordingly making it more readily movable and less expensive.

In the aforementioned conventional gob distributor, the positioning of each scoop is determined by the shape of its cam so that, should one of the sections suffer a break-down, it is not possible to omit positioning the scoop so that it would deliver a gob to that section. In this case, an interceptor is introduced to prevent the gob from entering the scoop, the interceptor being introduced and withdrawn each time the section is reached in the gob distributor sequence. Although the interceptor mechanism is arranged to be fail safe, this arrangement is less inherently safe than can be achieved with a distributor according to the last preceding paragraph but one since the operation of the moving means corresponding with bringing the scoop into position to deliver to the broken down section can be omitted thereby eliminating the possibility that a gob will arrive at a section which is being repaired. In this connection, it is advantageous if the moving means is also operable to move the gob distributor to a third position thereof in which any gobs which fall from the feeder orifice fall through a passage through the distributor without being delivered to any of the sections. The distributor can, in this case, be moved to its third position instead of its first or its second position when a gob is due to be delivered to the broken down section. Furthermore, in order to eliminate the possibility of two successive gobs being delivered to the same section, it is advantageous, if control means of the distributor is arranged to control the operation of the moving means so that, whenever a gob has been delivered by one of the scoops, the distributor is moved to its third position and is then moved to either its first or its second position to deliver the next gob.

In order to achieve an even more compact construction, it is advantageous if the turning means comprises an externally-toothed ring-shaped gear for each scoop, one of the scoops being mounted on each gear with the scoop passing through the gear, each gear being arranged to turn about the aforementioned vertical axis of the scoop, an internally-toothed ring-shaped gear through which the scoops pass and which is meshed with the externally-toothed gears, and a servo-motor arranged to turn the internally-toothed gear so that the scoops are turned about their respective vertical axes as aforesaid.

The invention also provides a method of distributing gobs of molten glass to individual sections of a glassware manufacturing machine of the individual section type, the method utilising a first gob-directing scoop and a second gob-directing scoop, each scoop having an upper end arranged to receive a gob falling from a feeder orifice and a lower end arranged to be aligned with a gob guide of a section of the machine which is arranged to guide gobs delivered thereto to a mould of the section, the method comprising positioning the first scoop in position to deliver gobs to half the sections of the machine in turn and positioning the second scoop in position to deliver gobs to the other half of the sections of the machine in turn, the first and the second scoops being so positioned in any selected order so that the gobs are delivered to the sections in the selected order, the scoops being positioned by turning them about respective vertical axes thereof to bring a scoop to a required orientation thereof, and moving the scoops to bring a selected one of the scoops to a position in which its upper end is vertically below the feeder orifice.

BRIEF DESCRIPTION OF THE DRAWINGS

There now follows a detailed description, to be read with reference to the accompanying drawings of a gob distributor which is illustrative of the invention and of an illustrative method of using the illustrative distributor. It is to be understood that the illustrative distributor and the illustrative method have been selected for description by way of example and not of limitation of the invention.

In the drawings:

FIG. 1 is a plan view of the illustrative gob distributor; and

FIG. 2 is a side elevational view, with parts broken away to show the construction, of the illustrative gob distributor.

DETAILED DESCRIPTION OF PREFERRED EMBODIMENT OF THE INVENTION

The illustrative gob distributor is for a glassware manufacturing machine of the individual section type and is operable to distribute gobs of molten glass to individual sections of the machine in a selected sequence. In the machine (which is not shown in the drawings), the individual sections are arranged side by side on a common frame. The machine with which the illustrative gob distributor operates is arranged to operate in the so-called "double gob mode" in which each section operates on two gobs simultaneously. Each section thus has two parison moulds in which gobs are moulded into parisons and two gob guides, one for each mould, which are arranged to guide gobs delivered thereto by the distributor to the mould.

The illustrative gob distributor comprises a casing 10 which is hollow and supports, within it or upon it, the remainder of the distributor. The casing 10 is supported on two parallel guide rods 12, one above the other, which extend above the sections of the machine, so that the distributor can slide along the rods 12 in a direction which is transverse to the sections.

The illustrative gob distributor also comprises a first 14, a second 16, a third 18, and a fourth 20 gob-directing scoop. Each scoop 14, 16, 18 and 20 is arranged to deliver a gob to a gob guide of any of a group of the sections. The first and third scoops 14 and 18 are arranged to deliver gobs to the gob guides of a first group of sections, half the total number, while the second and fourth scoops 16 and 20 are arranged to deliver gobs to the gob guides of a second group of section, the remaining half of the total number. If the machine is a six section machine, the scoops 14 and 18 are arranged to deliver gobs to the first three sections, numbering consecutively along the section frame, while the scoops 16 and 20 are arranged to deliver gobs to the remaining three sections. In the case of an eight or ten section machine, each scoop is arranged to deliver gobs to four or five sections respectively.

The gob-directing scoops 14, 16, 18 and 20 have an upper tubular portion which passes through the casing 10 and a lower trough-like portion beneath the casing 10 which is curved in a vertical plane (see FIG. 2). A circular upper end of each scoop 14, 16, 18 and 20 is arranged to receive a gob falling from a feeder orifice of a forehearth (not shown) and a lower end of a each scoop 14, 16, 18 and 20 is arranged to be aligned with gob guides of any of the first or the second group of sections, as appropriate, so that the scoop delivers the gob to the guide.

The illustrative gob distributor also comprises positioning means operable to position a selected one of the scoops 14 and 16 and a selected one of the scoops 18 and 20 so that the upper ends of the selected scoops are each vertically below one of two feeder orifices and the lower ends thereof are aligned with the gob guides of a selected one of the sections of the group of sections associated with the scoops, both scoops 14 and 16 or 18 and 20 being aligned with the same section guides.

The positioning means of the illustrative gob distributor comprises moving means operable to move the gob distributor selectably to a first position thereof in which the upper ends of the scoops 14 and 18 are vertically below the feeder orifices or to a second position thereof in which the upper ends of the scoops 16 and 20 are vertically below the orifices. The moving means is operable to move the casing 10 along the rods 12 to affect this movement. The moving means comprises a cylinder 22 formed within the casing 10 and a piston 24 which forms a piston and cylinder assembly with the cylinder 22. A lower one of the rods 12 passes axially through the cylinder 22 and the piston 24 is fixed on this rod 12 within the cylinder 22. The arrangement is such that, when fluid under pressure is introduced into the cylinder 22 on one side of the piston 24, the casing 10, and therefore the entire distributor, slides along the rods 12.

FIG. 1 shows the illustrative gob distributor in the first position thereof in which the upper ends of the scoops 14 and 18 are vertically below the feeder orifices. In this position, the piston 24 abuts one end of the cylinder 22. In order to move the illustrative gob distributor to its second position in which the upper ends of the scoops 16 and 20 are vertically below the feeder orifices, fluid under pressure is introduced into the cylinder 22 between the piston 24 and the end of the cylinder 24 which it abuts. This causes the distributor to move horizontally along the rods 12, downwardly viewing FIG. 1, until the piston 24 abuts the opposite end of the cylinder 22.

The moving means of the illustrative gob distributor is also operable to move the distributor to a third position thereof in which the piston 24 is halfway along the cylinder 22. This position is achieved by cutting off the supply of fluid under pressure to the cylinder 22 so that the distributor comes to rest halfway between its first and its second positions. A passage 26 passes downwardly through the casing 10 at a position such that, when the distributor is in its third position, any gobs which fall from the feeder orifices fall through the passage 26 and, therefore, do not enter any of the scoops 14, 16, 18 and 20 and are not delivered to any of the sections. The passage 26 is above a cullet chute (not shown) when the distributor is in its third position.

The positioning means of the illustrative gob distributor also comprises turning means operable to turn each of the scoops 14, 16, 18 and 20 about a respective vertical axis to bring the lower end thereof to an orientation such that, when the upper end of the scoop is vertically below a feeder orifice, the lower end thereof is in alignment with the gob guide of a selected one of the sections. The turning means comprises four externally-toothed ring-shaped gears 28, one for each scoop 14, 16, 18 and 20. One of the scoops 14, 16, 18 and 20 is mounted on each of the gears 28 with the scoop passing through the gear. The gears 28 are contained within the casing 10 and each is arranged to turn about the aforementioned vertical axis of its respective scoop. The turning means also comprises an internally-toothed ring-shaped gear 30 mounted on bearings 32 within the casing 10 for turning movement about a vertical axis halfway between the vertical axes of the scoops 14 and 20. The gear 30 surrounds the gear 28 and meshes with all of them, the scoops 14, 16, 18 and 20, therefore, passing through the gear 30. The turning means also comprises a D.C. servo-motor 34 mounted on top of the casing 10 and arranged to turn the gear 30 about its vertical axis so that the scoops 14, 16, 18 and 20 are turned about their respective vertical axes as aforesaid. The servo-motor 34 drives a horizontal input shaft 36 of a gear box 38 which contains two bevel gears 40 and has a vertical output shaft 42 extending into the casing 10. A gear 44 is fixed on the shaft 42 and meshes with the gear 30 to transmit the drive to the gear 30. The space within the gear 30 is filled with oil which lubricates the motions of the gears 28, 30 and 44 and reduces maintenance. Because the scoops 18 and 20 are further from the sections than are the scoops 14 and 16, the scoops 18 and 20 turn through smaller arcs to face the sections than do the scoops 14 and 16. This is achieved by having slightly less teeth on the gears 28 of the scoops 18 and 20 than on the gears 28 of the scoops 14 and 16.

The illustrative gob distributor thus comprises a first gob directing scoop 14 arranged to deliver gobs to a first group of sections, a second gob-directing scoop 16 arranged to deliver gobs to a second group of sections, and two further gob-directing scoops 18 and 20, each associated with one of the scoops 14 and 16 and arranged to deliver a gob to the same section as its associated scoop simultaneously.

The illustrative gob distributor is arranged to deliver two gobs to each section in turn. However, modifications of the illustrative gob distributor can be arranged to deliver different numbers of gobs. If one gob is to be delivered, the scoops 18 and 20 are omitted. If three gobs are to be delivered, the gear 30 is enlarged and the scoops 14 and 18, and 16 and 20 are separated further to make way for further scoops. The further scoops can each be driven from the gear 30 through two idler gears.

The illustrative method of distributing gobs will now be described. In the illustrative method, the illustrative gob distributor is utilised. Thus, a first gob-directing scoop 14 and a second gob-directing scoop 16 are provided. In the illustrative method, the first scoop 14 is positioned in position to deliver gobs to half the sections of the machine in turn and the second scoop 16 is positioned in position to deliver gobs to the other half of the sections of the machine in turn, the positioning being achieved by controlled operations of the moving and turning means of the distributor. The scoops 14 and 16 are positioned in any selected order so that the gobs are delivered to the sections in the selected order.

While it is possible to deliver gobs to the sections in any selected order, e.g. the first scoop 14 may make all its deliveries one-after-the-other and the second scoop 16 then make its deliveries, in the illustrative method, in order to minimise the movements required gobs are delivered to two of the sections while the scoops 14 and 16 are in one orientation thereof with the scoops being moved between deliveries and then scoops are turned to a new orientation. To illustrate this; if the illustrative method is used to distribute gobs to a six-section machine (whose sections are numbered consecutively along the machine frame), the illustrative method comprises the following steps:

(a) operating the servo-motor 34 to turn the scoops 14 and 16 about their respective vertical axes to bring the scoops to an orientation in which they are orientated to face sections 1 and 4 of the machine respectively;

(b) moving the distributor and therefore the scoops to a first position in which the upper end of the first scoop 14 is vertically below the feeder orifice and the lower end thereof is aligned with the gob guide of section 1 of the machine, this movement is accomplished by operating the piston and cylinder assembly 22,24;

(c) after a gob has been delivered by the scoop 14 to section 1, moving the distributor and therefore the scoops to a second position thereof in which the upper end of the second scoop 16 is vertically below the feeder orifice and the lower end thereof is aligned with the gob guide of section 4 of the machine so that a gob received by the scoop 16 is delivered to the gob guide, this movement is accomplished by a further operation of the piston and cylinder assembly 22,24;

(d) after a gob has been delivered by the scoop 16 to section 4, turning the scoops 14 and 16 about their axes to bring the scoops to an orientation in which they are orientated to face sections 3 and 6 of the machine respectively such that, when the upper end of one of the scoops 14 and 16 is vertically below the feeder orifice, the lower end thereof is aligned with the gob guide of a section 3 or 6 respectively of the machine, this turning being achieved by operating the servo-motor 34;

(e) moving the scoops so that a gob can be delivered to section 3 by the scoop 14;

(f) after a gob has been delivered to section 3, moving the scoops so that a gob can be delivered to section 6 by the scoop 16;

(g) after a gob has been delivered to section 6, turning the scoops 14 and 16 to an orientation in which they face sections 2 and 5 respectively;

(h) after a gob has been delivered to section 5 by the scoop 16, moving the scoops so that a gob can be delivered by the scoop 14 to section 2.

After a gob has been delivered to section 2, the steps (a) to (h) are repeated as necessary. It will be apparent that the scoops 18 and 20 mirror the movements of their associated scoops 14 and 16 respectively and act to deliver further gobs to the sections. It can be seen that only three turning movements of the scoops are required in delivering gobs to the six sections.

In the illustrative method, after each gob delivery, the scoops 14 and 16 are moved to a third, central, position thereof in which the passage 26 is vertically below the feeder orifices. The scoops 14 and 16 pause in this position rather than pass through it so that a positive action is required to move them into their first or second position. While in the third position, any gobs which fall from the feeder orifices fall through the passage 26 without being delivered to any of the sections. This arrangement increases the safety of the method, since the distributor can be left in a disabled condition in which no gobs are delivered to sections and, in the event of a section being inoperative, the movement of the scoops which would bring a scoop into position to deliver a gob to that section can be omitted without any danger of delivering two gobs to the same section.

The illustrative gob distributor is compact and can readily be moved making the illustrative method described practical. The number of turning movements of each scoop can be reduced (even halved), when compared with conventional gob distributors and the maximum swing of each scoop can be reduced as only half as many sections must be reached. Furthermore, operation of the illustrative gob distributor is safer than that of conventional gob distributors.

I claim:

1. A gob distributor for a glassware manufacturing machine of the individual section type operable to distribute gobs of molten glass to individual sections of the machine in a selected sequence, the individual sections being arranged side-by-side and each having a gob guide arranged to guide gobs delivered thereto to a mold of the section, the distribution comprising first gob directing means including at least one scoop arranged to deliver gobs to gob guides of a first group of the sections, second gob directing means including at least one scoop arranged to deliver a gob to gob guides of a second group of the sections, each of said gob directing scoops having an upper end adapted to receive a gob falling from a feeder and a lower end adapted to be aligned with gob guides of the first or the second group of sections, respectively so that the scoop delivers the gob to the guide, housing means for supporting said first and second gob directing means, and positioning means for moving said housing means horizontally between a first position in which the upper end of the at least one scoop of said first gob directing means is vertically below the feeder to a second position at which the upper end of the at least one scoop of said second gob directing means is vertically below the feeder, and means for turning each of the scoops about a respective vertical axis extending through the upper end thereof to bring the lower end thereof to an orientation in alignment with the gob guide of a selected one of the sections wherein the means for turning includes an externally-toothed ring-shaped gear for each scoop, one of the scoops being mounted on each gear with the scoop passing through the gear, each gear being arranged to turn about the aforementioned vertical axis of the scoop, an internally-toothed ring-shaped gear through which the scoops pass and which is meshed with the externally-toothed gears, a servo-motor, and means connecting said servo-motor and said internally-toothed gear so that the scoops are turned about their respective vertical axes.

2. A gob distributor according to claim 1, further including means defining a passage in said housing means, and wherein said positioning means includes means for displacing said housing means to a third position thereof in which any gobs which fall from the feeder orifice fall through said passage without being delivered to any of the sections.

3. A gob distributor according to claim 2, wherein said positioning means comprises means whenever a gob has been delivered by one of the scoops, for displacing said housing means to said third position prior to its being moved to either said first or said second position to deliver the next gob.

4. A gob distributor according to claim 1 wherein said first and second gob directing means each comprises a plurality of scoops.

* * * * *